(12) United States Patent
Diab et al.

(10) Patent No.: US 9,525,593 B2
(45) Date of Patent: *Dec. 20, 2016

(54) OVERSUBSCRIBING A PACKET PROCESSING DEVICE TO ADJUST POWER CONSUMPTION

(71) Applicant: Broadcom Corporation, Irvine, CA (US)

(72) Inventors: Wael Diab, San Francisco, CA (US); Nicholas Ilyadis, Merrimack, NH (US); Eugene Opsasnick, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,172

(22) Filed: Jul. 15, 2015

(65) Prior Publication Data

US 2015/0319041 A1 Nov. 5, 2015

Related U.S. Application Data

(63) Continuation of application No. 13/538,144, filed on Jun. 29, 2012, now Pat. No. 9,086,878.

(51) Int. Cl.
*G06F 1/00* (2006.01)
*G06F 1/32* (2006.01)
*H04L 12/24* (2006.01)
*H04L 12/26* (2006.01)

(52) U.S. Cl.
CPC .......... *H04L 41/0816* (2013.01); *G06F 1/324* (2013.01); *G06F 1/3206* (2013.01); *H04L 43/0882* (2013.01); *H04L 43/0894* (2013.01); *Y02B 60/1217* (2013.01); *Y02B 60/32* (2013.01)

(58) Field of Classification Search
CPC .................................................. G06F 1/3203
USPC ........................................................... 713/322
See application file for complete search history.

(56) References Cited

U.S. PATENT DOCUMENTS

| | | | | |
|---|---|---|---|---|
| 5,488,609 | A * | 1/1996 | Hluchyj et al. | 370/232 |
| 5,687,167 | A * | 11/1997 | Bertin et al. | 370/254 |
| 6,449,650 | B1 * | 9/2002 | Westfall et al. | 709/228 |
| 7,065,482 | B2 * | 6/2006 | Shorey et al. | 709/224 |

(Continued)

OTHER PUBLICATIONS

"Clock rate," *Wikipedia*, Mar. 18, 2012, from http://en.wikipedia.org/w/index.php?title=Clock_rate&oldid=482550887, 3 pages.

(Continued)

*Primary Examiner* — Suresh Suryawanshi
(74) *Attorney, Agent, or Firm* — Sterne, Kessler, Goldstein & Fox PLLC

(57) ABSTRACT

Embodiments are directed to saving power consumption in packet processing devices. A method for controlling power consumption of a packet processing device includes determining a power-save link utilization based upon one or more power-save enabled links of the packet processing device, determining an aggregate minimum processing bandwidth for the packet processing device based at least upon the determined power-save link utilization, and adjusting a processing capacity of the packet processing device based upon the determined aggregate minimum processing bandwidth, wherein the power consumption is changed by the adjusting. System and computer program product embodiments are also disclosed.

19 Claims, 7 Drawing Sheets

(56) References Cited

U.S. PATENT DOCUMENTS

| | | | |
|---|---|---|---|
| 7,689,693 B2* | 3/2010 | Doshi et al. | 709/226 |
| 8,090,969 B2 | 1/2012 | Emara et al. | |
| 8,171,327 B2 | 5/2012 | Hisamatsu | |
| 8,199,672 B1 | 6/2012 | Nachum et al. | |
| 8,326,372 B2 | 12/2012 | Raissinia | |
| 8,601,297 B1 | 12/2013 | Abts et al. | |
| 9,086,878 B2 | 7/2015 | Diab et al. | |
| 2007/0201380 A1 | 8/2007 | Ma et al. | |
| 2008/0304519 A1 | 12/2008 | Koenen et al. | |
| 2014/0006822 A1 | 1/2014 | Diab et al. | |

OTHER PUBLICATIONS

Curtis, S., "Broadcom Unveils New EEE Silicon Chips," *TechWeek Europe*, Oct. 4, 2010, from http://www.techweekeurope.co.uk/news/broadcom-unveils-new-eee-silicon-solutions-10341, 3 pages.

Merritt, R., "HP rolls low-power Ethernet switches," Dec. 8, 2010, from www.eetimes.com/General/PrintView/4211349, 1 page.

Smith, K., "How to Clock Your Processor," *eHow*, Mar. 20, 2012, from http://www.ehow.com/print/how_5255742_overclock-amd-cpu.html, 2 pages.

Smith, M., "How to Overclock an AMD CPU," *eHow*, Mar. 20, 2012, from http://www.ehow.com/print/how_7491989_clock-processor.html, 2 pages.

\* cited by examiner

OVERSUBSCRIBING A PACKET PROCESSING DEVICE TO ADJUST POWER CONSUMPTION

CROSS-REFERENCE TO RELATED APPLICATIONS

This application is a continuation of U.S. patent application Ser. No. 13/538,144, filed Jun. 29, 2012, now U.S. Pat. No. 9,086,878, which is incorporated by reference herein in its entirety.

BACKGROUND OF THE INVENTION

Field of the Invention

Embodiments of this disclosure are related to controlling the power consumption of packet processing devices.

Background Art

Packet processing devices, such as routers, switches, bridges, and the like, continue their growth in capacity and performance. For example, these devices continue to increase the overall link bandwidths that are supported on the data interfaces. Further, each of these devices may have a substantial number of data interfaces configured to operate at very high data rates. For example, many routers and switches in core networks have multiple interfaces operating at link bandwidths of 1 Gbps, 10 Gbps, 40 Gbps, 100 Gbps, or above.

As the link bandwidths increase, the packet processing devices are required to process an increased throughput of packets, which inevitably leads to higher power consumption. This is especially noticeable in data centers that aggregate various types network equipment, including packet processing devices, to support Internet traffic management and cloud computing. Typically, however, each network interface in a packet processing device has alternating periods of high bandwidth use and periods of low or minimal bandwidth use. Techniques, such as IEEE 802.3az Energy Efficient Ethernet (EEE) may be used to reduce power consumption to some extent on particular ports when incoming traffic is low. For example, EEE provides a technique referred to as Low Power Idle (LPI) by which interfaces can be transitioned to a low power state when the corresponding links are determined to be idle. EEE also provides a subrating technique by which one or more channels in a multichannel physical layer interface (also referred to as "PHY") can be deactivated when all the channels are not needed to accommodate the current bandwidth requirements. It is desirable, however, to reduce power consumption beyond the port-based savings associated with EEE.

BRIEF SUMMARY

Embodiments of the present disclosure are directed to reducing power consumption in packet processing devices. Embodiments enable power savings beyond the per-port savings provided by EEE, by adjusting the aggregate processing capacity of packet processing devices when utilization is low. Utilization levels, as well as application requirements such as latency and other quality of service (QoS) requirements may be used to determine the aggregate processing capacity of the packet processing device. According to an embodiment, a method for controlling power consumption of a packet processing device includes determining a power-save link utilization based upon one or more power-save enabled links coupled to the packet processing device, determining an aggregate minimum processing bandwidth for the packet processing device based at least upon the determined power-save link utilization, and adjusting a processing capacity of the packet processing device based upon the determined aggregate minimum processing bandwidth.

In another embodiment, a packet processing device includes one or more processors, and one or more clocks, wherein a processing speed of each of the one or more processors is determined based, at least in part, upon a clock from the one or more clocks. The packet processing device includes an aggregate minimum bandwidth estimator configured to be executed by the one or more processors and further configured to determine a power-save link utilization based upon one or more power-save enabled links coupled to the packet processing device, and to determine an aggregate minimum processing bandwidth for the packet processing device based at least upon the determined power-save link utilization. The packet processing device further includes a processing capacity adjuster configured to be executed by the one or more processors and further configured to adjust a processing capacity of the packet processing device based upon the determined effective processing bandwidth.

Yet another embodiment is a computer readable storage medium having instructions recorded thereon, that when executed by a processor, causes the processor to perform a method to control power consumption of a packet processing device. The method includes determining a power-save link utilization based upon one or more power-save enabled links coupled to the packet processing device, determining an aggregate minimum processing bandwidth for the packet processing device based at least upon the determined power-save link utilization, and adjusting a processing capacity of the packet processing device based upon the determined aggregate minimum processing bandwidth.

Further features and advantages of the present disclosure, as well as the structure and operation of various embodiments thereof, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments.

DETAILED DESCRIPTION OF THE INVENTION

While the present disclosure is described herein with reference to illustrative embodiments for particular applications, it should be understood that the disclosure is not limited thereto. Those skilled in the art with access to the teachings herein will recognize additional modifications, applications, and embodiments within the scope thereof and additional fields in which the disclosure would be of significant utility.

Embodiments disclosed in the specification provide for oversubscribing the processing capacity of packet processing devices, such as, but not limited to, switches and routers in communication networks. A packet processing device is "oversubscribed" when its configured processing capacity is less than the processing capacity required to handle the maximum bandwidth of the one or more links coupled to it. The oversubscription, in various embodiments, is performed by reconfiguring the number of active processors and/or clock rates at which one or more of the processors operate. In some embodiments, the amount by which the processing capacity is oversubscribed is determined based upon the utilization of power-saving enabled links (such as, but not limited to, EEE-enabled links). In some embodiments, in addition to the link utilization, application requirements (sometimes referred to as "application-specific requirements") such as latency and QoS may be considered in determining the amount by which the processing capacity is oversubscribed. By dynamically reconfiguring the number of active processors and/or the clock rates associated with the processors to oversubscribe the processing capacity during periods of low traffic, the disclosed packet processing devices operate with significantly reduced power consumption. Moreover, by dynamically performing the reconfiguration based upon a traffic volume for selected links adjusted for types of traffic, the power savings are achieved without adversely affecting latency sensitive classes of traffic that have latency requirements.

For example, if the aggregated link utilization of the power-save enabled links is 60%, then the current processing capacity may be reduced by 40%. Thus, a packet processing device with a current processing capacity of 10 Gbps can, upon having a power-save link utilization of 60%, dial down its capacity to 60% of the 10 Gbps. Such a reduction, or oversubscription, of processing capacity would effectively take advantage of the time intervals during which the links are in low power mode to catch up on the processing of enqueued data, while reducing the running speed of the processors to save power.

Figure 1:
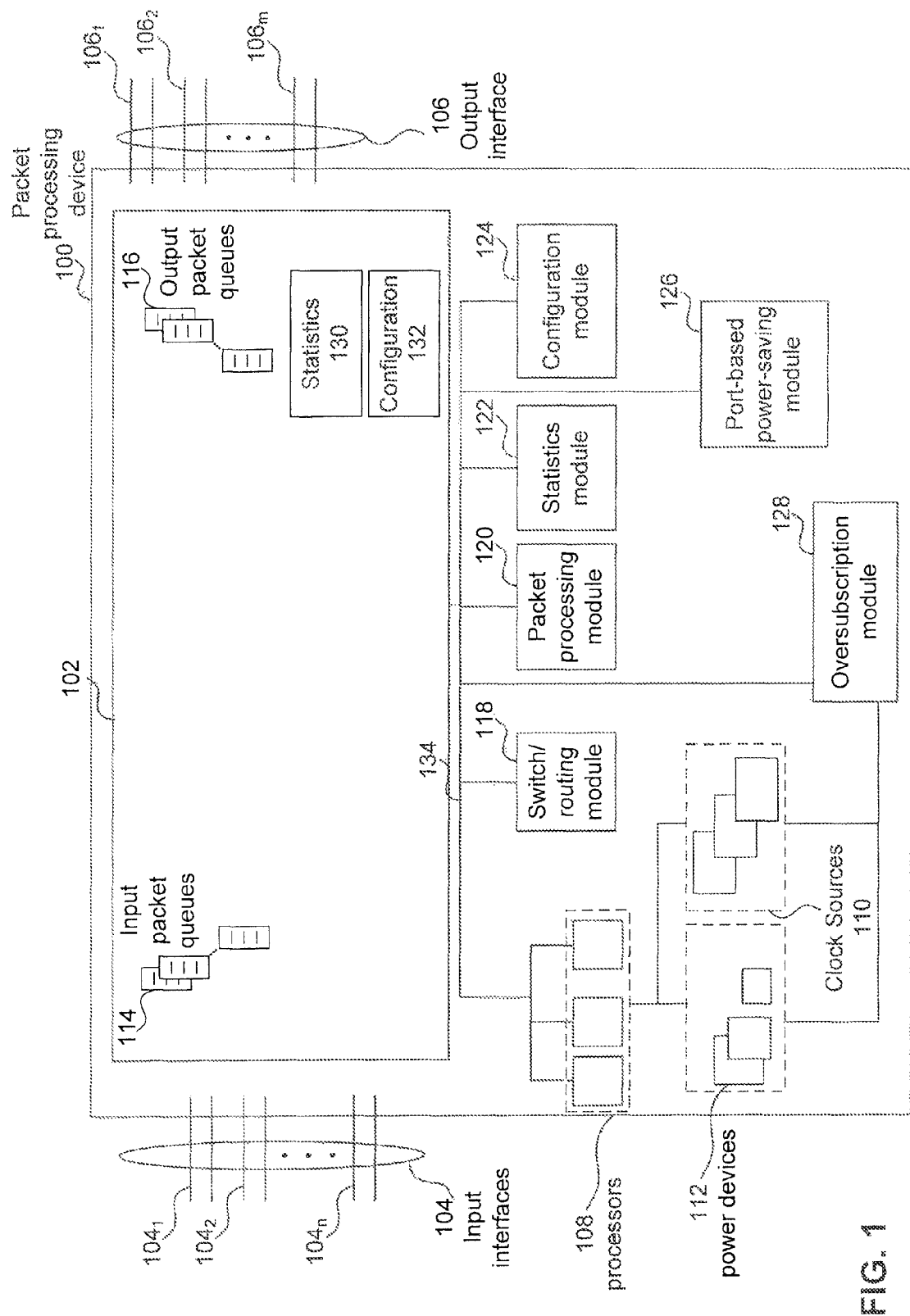
FIG. 1 is a block diagram of an exemplary packet processing device, according to an embodiment of the present disclosure.

FIG. 1 illustrates an exemplary packet processing device 100 according to an embodiment of the present disclosure. Packet processing device 100 may include, but is not limited to, a router, a switch, a bridge, a packet gateway, or other network communication device that is an intermediate device for processing packet streams. For example, without limitation, packet processing device 100 may be a multi-port multi-gigabit packet switch where one or more ports are EEE-enabled.

Packet processing device 100 includes a memory 102, one or more input interfaces 104 ($104_1 \ldots 104_n$, where n>0), one or more output interfaces 106 ($106_1 \ldots 106_m$, where m>0), one or more processors 108, one or more clock sources 110, one or more power device 112, a packet switching/routing module 118, a packet processing module 120, a statistics module 122, a configuration module 124, a port-based power saving module 126, an oversubscription module 128, and an communication infrastructure (also referred to as "interconnection bus") 134.

Memory 102 may include one or more of: static random access memory (SRAM), dynamic random access memory (DRAM), FLASH memory or the like. In various embodiments, memory 102 can also include a persistent data storage medium such as magnetic disk, optical disk, flash memory, or the like. Such computer-readable storage mediums can be utilized for storing software programs and/or logic instructions that implement the functionality of one or more components of packet processing device 100. Accordingly, memory 102 may include instructions executing the functionality performed by packet processing device, and any also may store packets and associated information during the processing of packets in the device.

Moreover, memory 102 may include input packet queues 114 and output packet queues 116. Input packet queues 114 may include a configurable set of queues for holding incoming packets until they are selected for processing within packet processing device 100. Output packet queues 116 may include a configurable set of queues to hold packets that have completed processing in the packet processing device until they are transmitted, or selected for transmission, from an output interface 106. Memory 102 may also include statistics 130 and configurations 132. Collected statistics 130 include per-port packet statistics, and may include information regarding packet counts based upon protocol, source or destination, type of packet, or other categories based upon one or more of the packet header fields. According to an embodiment, statistics module 130 maintains the statistics counts in a manner such that historical statistics can be determined over a predetermined time window. Configurations 132 may include configuration parameters for each of the input interfaces 104 and output interface 106.

Input interfaces 104 may include one or more Ethernet links, Gigabit Ethernet links, or other links by which packet processing device 100 receives packets from other devices. Likewise, output interfaces 106 may include one or more Ethernet links, Gigabit Ethernet links, or other links by which packet processing device 100 transmits packets to other devices. Links associated with input interfaces 104 and output interfaces 106 may use optical, electrical, or any other transmission technology to transmit packets from or to packet processing device 100. One or more interfaces 104 and 106 may be power-save enabled, such as, for example, being configured to operate in accordance with EEE. As noted above, EEE provides for power-savings during low bandwidth utilization periods by the use of techniques such as LPI and/or sub-rating.

One or more processors 108 may include any central processing unit (CPU), or specialized processors such as, but not limited to, application specific integrated circuit (ASIC) or field programmable gate array (FPGA). Any of processors 108 can execute logic instructions to implement the functionality of or to control the operation of one or more components of packet processing device 100. One or more processors 108 may control the processing within packet processing device 100, and may, for example, execute, or control the execution of, one or more packet processing pipelines. The packet processing pipelines include a logical view of the processing path of packets from entry into packet processing device 100 to exit from packet processing device. The actual processing of a particular packet processing pipeline is performed by one or more processors 108. In some embodiments, switching/routing module 118 and packet processing module 120 may include logic for one or more portions of a packet processing pipeline. Switching/routing module 118, for example, can include packet forwarding logic based upon one or more of a destination, source, packet type, and the like. Packet processing module 120, for example, can include logic for packet reassembly, address translation, firewall, and other packet-based functions. In some embodiments, processors 108 can include one or more of the processing blocks corresponding to parts of the processing pipeline for a packet, such as, but not limited to, data plane processing blocks, switching blocks, routing blocks, medium access control (MAC) blocks, serializer-deserializer (SerDes) blocks, access control list (ACL) blocks, forwarding blocks, physical layer interface blocks, memory blocks etc. These processing blocks may be contained in one or multiple chips and/or systems.

Each of the clock sources 110 may provide a clock to control the speed of operation of one or more of the processors 108. Each of the clock sources 110 may provide a clock signal based upon a derived or generated clock signal. For example, each clock source 110 may include a crystal oscillator, phase lock loop (PLL), or may generate a clock signal by referencing another signal. In some embodiments, one or more of clock sources 110 may provide a clock signal to other components of packet processing device in addition to providing a signal to one or more processors 108. Although clock sources 110 are shown separately from processors 108, it should be noted that in some embodiments, one or more of the clock sources are located in processors 108.

According to an embodiment, one or more processors 108 may also be coupled to one or more of power supply devices 112. According to one embodiment, each of the processors 108 may be powered by a separate power supply device. According to another embodiment, each group of processors 108 may be powered by a separate power supply device. According to an embodiment, one or more power supply devices 112 may be turned on or off individually (e.g., without affecting the power status of other power devices), or in groups having or more power supply devices. Although power devices 112 are shown separately from processors 108, it should be noted that in some embodiments, one or more power supply devices are located in processors 108.

Statistics module 122 operates to collect packet statistics from each of the ports (e.g., input interfaces 104 and output interfaces 106). The type of statistics, the duration of collection, and the like, may be configurable.

Configuration module 124 operates to configure packet processing device 100 and/or any of its input or output interfaces (e.g., input interfaces 104 and output interfaces 106). Configuration module 124 may be invoked by a user interface (not shown) to configure the interfaces and processing of packet processing device 100.

Port-based power saving module 126 operates to change the operational state of respective interfaces (e.g., interfaces 104 and 106) in order to save power. Port-based power saving module 126 includes the capability to control one or more of the individual physical links corresponding to input interfaces 104 and output interfaces 106, in order to turn the individual links on or off, and/or to change a power mode associated with each physical link. Input interfaces 104 and/or output interfaces 106 for which the operational status or the power mode are manipulated by port-based power saving module 126 may have configuration parameters indicating that they are power-save enabled, such as, for example, being configured to operate in accordance with EEE. Interfaces that are not specifically configured as being power-save enabled may not be manipulated in order to save power. For example, in some embodiments, one or more of the interfaces (e.g. in interfaces 104 and/or 106) may be configured as "full rate" to indicate that their link rates should not be affected due to power saving considerations. One or more interfaces may be configured as "full rate" (or a similar configuration to indicate that the link rate of the interface should not be affected due to power saving considerations) based on the network topology. Any interfaces that are configured to not be affected due to power saving considerations are manipulated by port-based power saving module 126 and/or other modules to change the link rate due to power saving considerations.

With respect to interfaces of packet processing device 100 that are identified as power-save enabled, according to an embodiment, module 126 operates to negotiate with endpoints connected to those interfaces, in order to transition the respective link to a low power mode when conditions allow. According to an embodiment, port-based power saving module 126 may operate to manage one or more Ethernet interfaces according to a standard such as EEE, which is incorporated herein by reference in its entirety. EEE includes a low power mode in which some functionality of the individual physical links are disabled to save power when the system is lightly loaded (i.e. when packet flow is relatively low compared to available bandwidth). An EEE-enabled link is also transitioned to low power mode when no traffic is transmitted on that link. Example EEE techniques for power-saving include LPI and sub-rating, as noted above.

Oversubscription module 128 operates to adjust the processing capacity of packet processing device 100 in order to reduce power consumption. According to an embodiment, oversubscription module 128 operates to change the configuration of one or more processors 108, or more specifically, one or more power devices 112 and/or one or more clock sources 110, in order to adjust the processing capacity of packet processing device 100.

Figure 2:
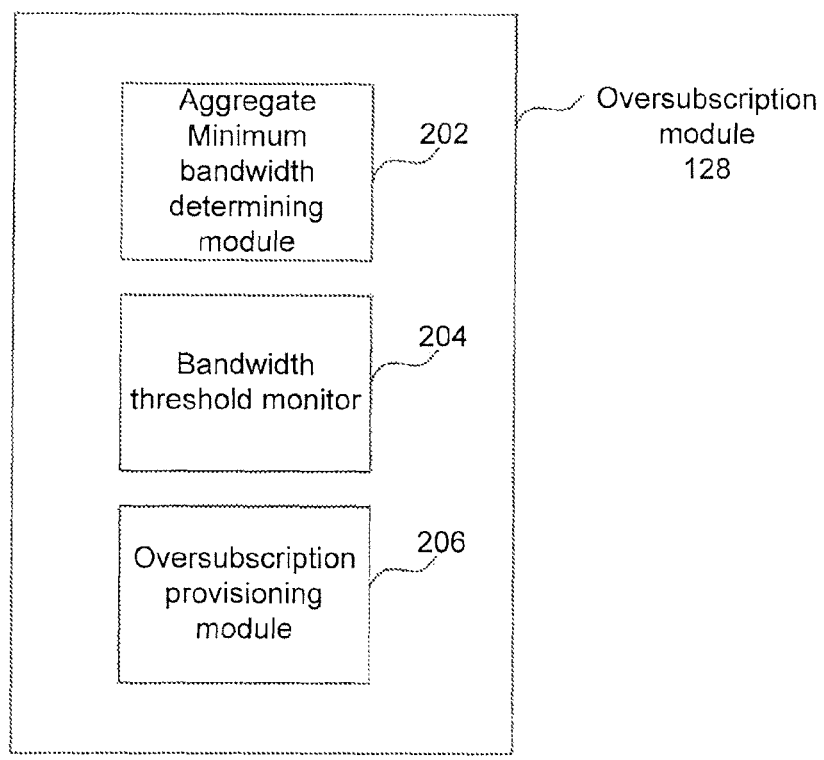
FIG. 2 is a block diagram of an exemplary oversubscription module, according to an embodiment of the present disclosure.

FIG. 2 illustrates a block diagram of an exemplary oversubscription module, according to an embodiment of the present disclosure. Oversubscription module 128 includes a minimum bandwidth determining module 202, an actual bandwidth threshold monitor 204, and an oversubscription provisioning module 206.

Minimum bandwidth determining module 202 operates to determine an aggregate minimum bandwidth (also referred to as "aggregate minimum processing bandwidth") in packet processing device 100. The determined aggregate minimum bandwidth may be based upon utilization of one or more power-save enabled links. In addition, the aggregate minimum bandwidth may also be based upon application-specific requirements such as latency and other QoS requirements of one or more types of traffic received over the links. Application-specific requirements may be based upon one or more currently executing applications which has traffic on one or more of the links of the packet processing device, or on configuration. Application-specific requirements may include requirements such as, stringent latency requirements (e.g., packet latency less than a defined threshold value), energy saving requirements (e.g., transition to an idle mode if inactive for more than a specified time interval). In some embodiments, an initial determination of the aggregate minimum bandwidth based on link utilization levels may be changed by increasing it or by decreasing it in response to application requirements, such as, but not limited to, latency and other QoS requirements. For example, the aggregate minimum bandwidth may be increased in response to application-specific requirements of stringent latency, or it may be decreased in response to application-specific requirements and/or preference for energy saving. The aggregate minimum bandwidth is the bandwidth corresponding to a processing capacity at which the packet processing device can be oversubscribed while enabling the latency sensitive traffic to still meet the latency requirements despite the oversubscription. The determining of the aggregate minimum bandwidth is described below in relation to FIG. 6.

Actual bandwidth threshold monitor 204 operates to monitor the actual bandwidth utilized in packet processing device 100. The actual bandwidth utilization may be monitored and compared against one or more configurable thresholds in order to determine whether the current conditions require activating oversubscription, or whether the level of oversubscription can be changed in order to better respond to current bandwidth conditions.

Oversubscription provisioning module 206 receives inputs from modules 202 and 204 including, for example, any aggregate minimum bandwidth, and notice of bandwidth threshold crossings. Oversubscription provisioning module 206 operates to adjust the configuration of one or more processors, power supply devices, or clock sources, in order to change the processing capacity of the packet processing device. For example, when oversubscription module 206 is notified that a bandwidth threshold has been crossed, then module 206 may configure clock sources 110, power devices 112 or processors 108 in accordance with a new bandwidth condition in the packet processing device 100, where the new bandwidth condition is considerate of the aggregate minimum bandwidth. Oversubscription provisioning is further described below in relation to FIG. 7.

Interconnection bus 134 may include one or more interconnected bus structures that communicatively couple the various modules of packet processing device 100. Interconnection bus 134 may include, for example, one or more buses such as, an Advanced High Performance Bus (AHB) that uses a bus protocol defined in the AMBA Specification version 2 published by ARM Ltd, Peripheral Component Interconnect (PCI-E), or other internal component interconnection mechanism. Other bus protocols and/or proprietary buses could be used and are within the scope and spirit of the present disclosure. Bus 134 may also include memory interface buses.

Figure 3:
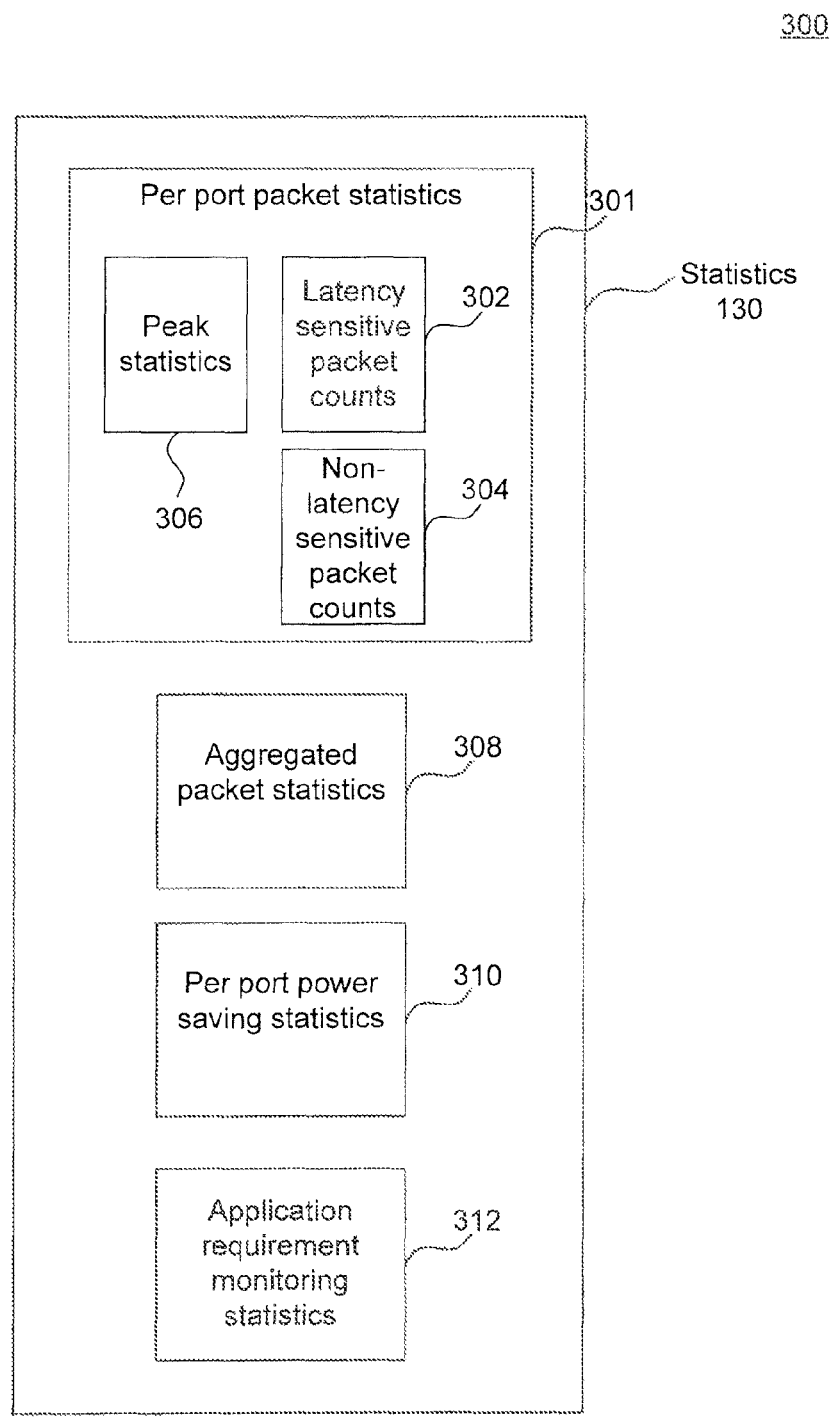
FIG. 3 is a block diagram of exemplary statistics collected in the packet processing device of FIG. 1, according to an embodiment of the present disclosure.

FIG. 3 illustrates exemplary statistics collected in the packet processing device 100 of FIG. 1, according to an embodiment of the present disclosure. According to an embodiment, statistics 130 includes, but is not limited to, per-port statistics 301, aggregated packet statistics 308, per-port power saving statistics 310, and application requirement monitoring statistics 312. Per-port packet statistics 301 may include, but is not limited to, latency sensitive packet counts 302, non-latency sensitive packet counts 304, peak statistics 306, and packet size distribution 314. Application requirement monitoring statistics 312 may include one or more of bandwidth used per application traffic stream, latency distribution per application traffic stream, dropped packets per application traffic stream, packet arrival times per application traffic stream. The statistics collected and how packets are identified as belonging to a particular application traffic stream may be configurable. For example, any one or a combination of two or more packet fields, such as, source address, destination address, source port, destination port, a stream identifier, a protocol field, a priority field, etc. may be used to classify incoming traffic into application streams for statistics gathering.

Latency sensitive packet statistics include statistics related to the actual bandwidth for packets belonging to latency sensitive traffic in one or more classes. Latency sensitive traffic may be identified based upon one or more of the following packet properties: packet type, protocol, source, destination, or input port configuration. The identification may be based upon a packet header field. Examples of latency sensitive packets include packets from a voice stream, audio video bridging (AVB) traffic, and packets containing an identifier (e.g., virtual local area network identifier (VLANID), source address, destination address) that have been configured in packet processing device 100 as a latency sensitive traffic type. AVB frames are standard Ethernet frames that are tagged with a VLAN tag which may include the VLANID. The VLAN tag also allows for priority information to be carried within the frames, such as, via the VLAN tag's Priority Code Point (PCP) field. These priority values may be mapped into traffic classes. For example, AVB Classes A and B, distinguished based upon the PCP field, define separate traffic classes based upon latency requirements.

Non-latency sensitive packet statistics include statistics related to the actual bandwidth for packets belonging to non-latency sensitive traffic in one or more classes. Non-latency sensitive traffic may be identified based one or more of the following packet properties: packet type, protocol, source, destination, or input port configuration. According to an embodiment, any traffic that has not been identified as latency sensitive, may be considered as non-latency sensitive. Examples of non-latency sensitive traffic include data traffic (e.g., Hyper Text Transport Protocol (HTTP) traffic, email). The traffic classes for the non-latency sensitive traffic can also be determined based upon a protocol field, a priority value included in the packet, or other identification fields configured in packet processing device 100 as non-latency sensitive traffic.

Peak statistics 306 include statistics related to the peak bandwidth consumed by latency sensitive traffic and non-latency sensitive traffic. Peak statistics 306 may include the actual peak traffic levels encountered on a per-port basis for each of the traffic types. Peak statistics 306 may also include the actual peak traffic levels for one or more identified application requirements such as for one or more latency classes and/or other QoS class. In some embodiments, peak statistics 306 may also include the duration for which such peak bandwidth was encountered.

Aggregated packet statistics 308 include aggregated statistics for the packet processing device. The statistics may be collected separately for latency sensitive and non-latency sensitive traffic classes. In some embodiments, within one or both of the latency-sensitive or non-latency sensitive traffic classes, aggregated statistics may be collected for sub-classes. For example, aggregated statistics may be determined separately for different classes of latency sensitive traffic, such as, for each class of AVB traffic.

Per-port power saving statistics 310 include the number of times, and the durations for which, power saving was active in each of the ports. According to an embodiment, power saving statistics include EEE statistics. The number of times each interface transitioned to low power mode, and the total duration within the last statistics interval in which the interface was in the low power mode may be collected as part of per-port power saving statistics 310.

Figure 4:
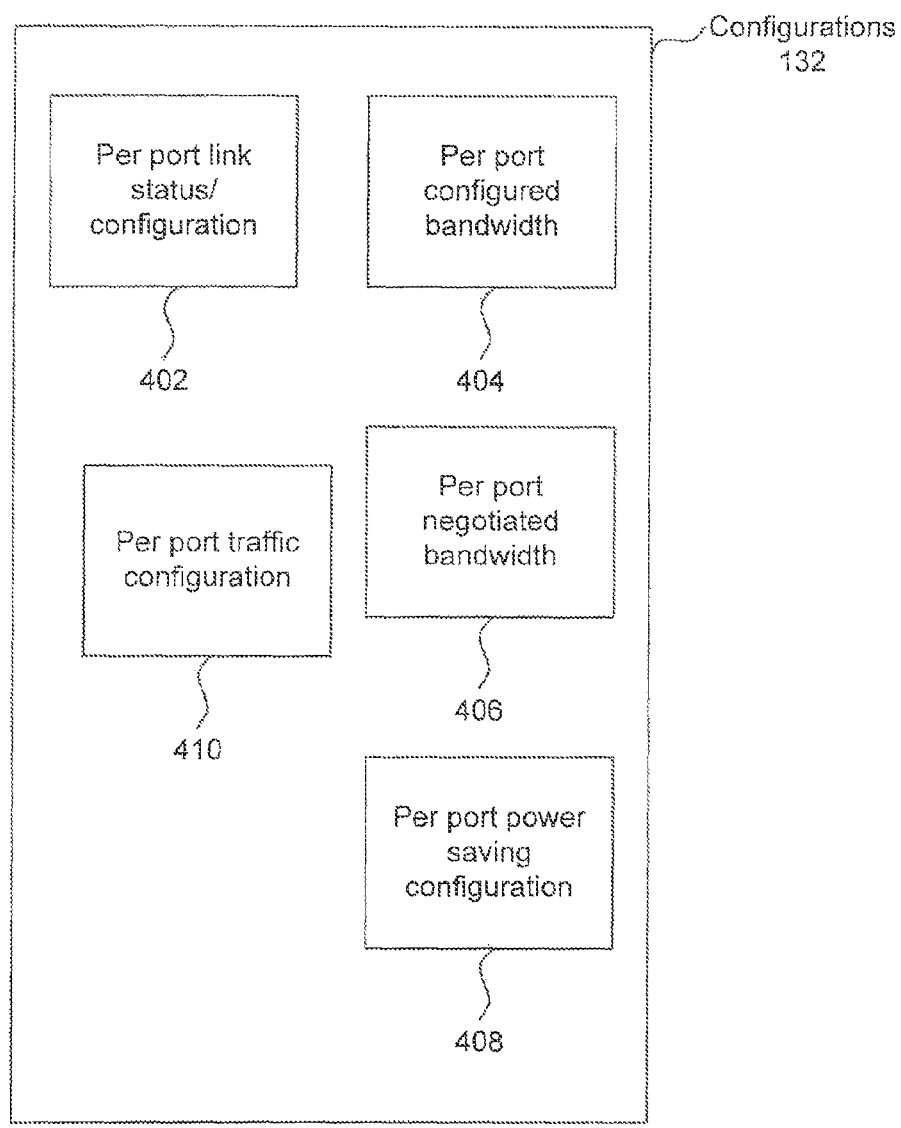
FIG. 4 is a block diagram of exemplary configurations in the packet processing device of FIG. 1, according to an embodiment of the present disclosure.

FIG. 4 illustrates exemplary configurations in the packet processing device 100 of FIG. 1, according to an embodiment of the present invention. Configurations 132 may include per-port link status and configuration, 402 per-port configured bandwidth 404, per-port negotiated bandwidth 406, per-port power saving configuration 408, and per-port traffic configurations 410.

Per-port link status and configurations 402 include configurations affecting one or more of the ports (e.g., input interfaces 104 and output interfaces 106). For each interface, interface level configuration parameters may include, but are not limited to: link type (e.g., Gigabit Ethernet), configured link bandwidth (e.g., maximum link bandwidth), link bandwidth (e.g., negotiated link bandwidth), link transmission medium type (e.g., wired, wireless, optical fiber, etc.), interface address configurations, link protocol configurations, and the like. Link protocol configurations, for example, may be based upon a protocol type or similar field in the packet or frame, and may be used to selectively configure and/or the packet processing device for various protocols.

Per-port configured bandwidth 404 includes the maximum capacity configured for one or more of the interfaces. The maximum capacity represents the maximum bandwidth that is permitted on that link. This may be configurable, and/or may have a default configuration value based upon the type of link, next hop (e.g., neighboring node), and other considerations.

Per-port negotiated bandwidth 406 may include an operating bandwidth negotiated by one or more interfaces with its neighbor at the other end of the link. The negotiated bandwidth may be dynamically determined and controlled by the one or more processors, such as processor 108. The negotiated link bandwidth is determined so that it does not exceed the maximum bandwidth configured for that link.

Per-port power saving configurations 408 include configuration parameters directed to power savings on one or more of the interfaces. According to an embodiment, power saving configurations include EEE configurations for one or more of the interfaces. EEE configurations can include EEE enabled parameters indicating whether EEE is enabled for a particular interface, one or more bandwidth thresholds that represent a bandwidth level for EEE activation, and the like.

Per-port traffic configurations 410 can include flow configurations, VLAN ID used and the like. Flow configurations may include parameters to configure one or more flows (also referred to as "streams"). One or more of an average bandwidth, maximum bandwidth, and a quality metric, may be associated with each flow. Persons skilled in the art would understand that one or more other parameters may also be defined, such as, for example: a minimum bandwidth, data type (e.g., voice, video etc.), and a peak bandwidth.

Figure 5:
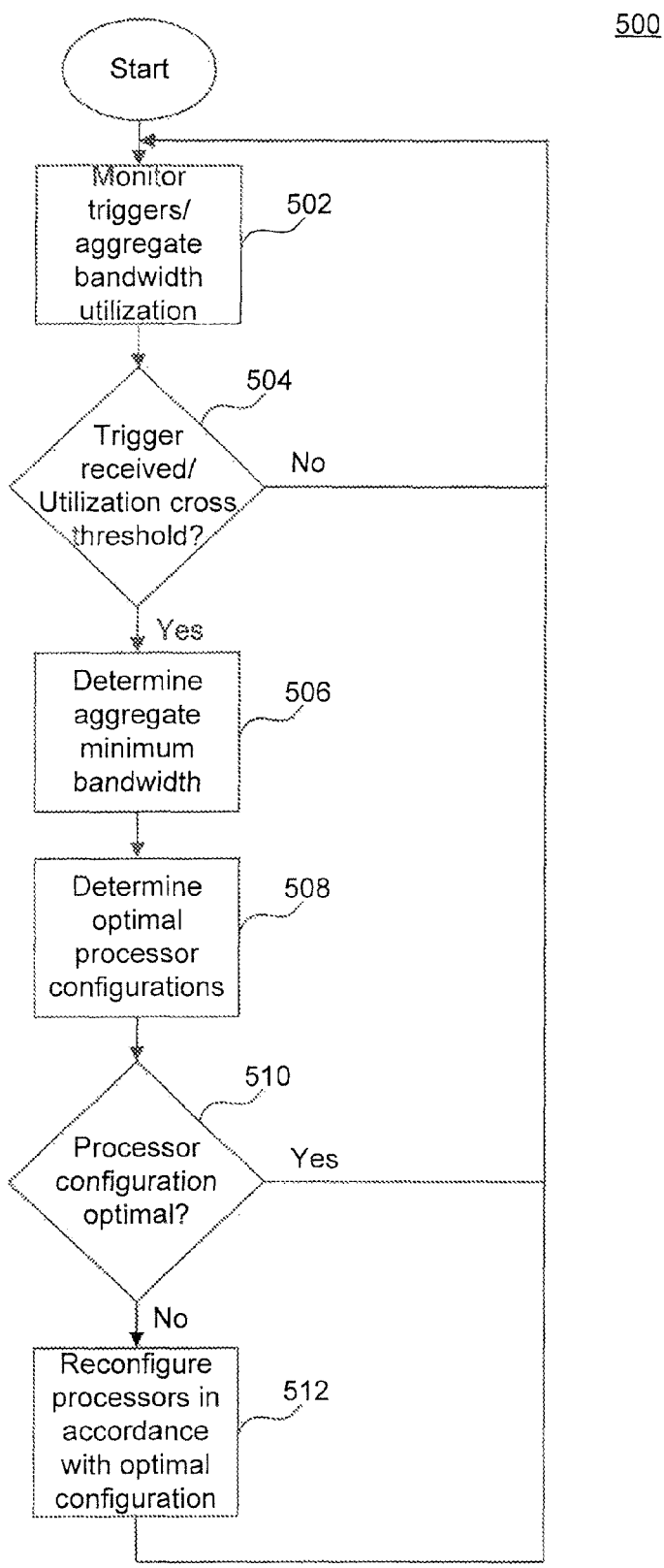
FIG. 5 illustrates a flowchart of a method for oversubscribing a packet processing device, according to an embodiment of the present disclosure.

FIG. 5 illustrates a flowchart of a method 500 for oversubscribing a packet processing device, according to an embodiment of the present disclosure. Method 500 can, for example, be performed by oversubscription module 128 of packet processing device 100. The steps 502-512 of method 500 may be performed in an order other than the order illustrated. Further, method 500 may not require all of the steps 502-512.

At step 502, one or more operational parameters of the packet processing device 100 are monitored to determine whether the device is available for oversubscription. As described below, the operational parameters may include link status of various links served by the packet processing device and bandwidth utilization of the device. For example, the power-save status of the one or more interfaces is monitored to detect the transition of the corresponding links to/from a low power mode. For example, for EEE-enabled links, the power saving statistics can be monitored for the corresponding links to detect the transition of one or more interfaces to/from a low power mode.

According to another embodiment, the bandwidth utilization of the packet processing device 100 is monitored. Monitoring the bandwidth utilization includes monitoring the number of active interfaces and the bandwidth utilization of each active interface (also referred to as a "port"). The monitoring may be based upon current and historical packet receive and/or transmit statistics. According to an embodiment, for each interface, packet receive and transmit statistics are aggregated over a running window of a configurable interval. The collected aggregated statistics are used to determine a utilization of the configured bandwidth of each interface, or more specifically, the communication link associated with the interface. According to an embodiment, the link utilization can be represented as a fraction of the configured maximum bandwidth associated with the interface. In another embodiment, utilization is determined as a fraction of the negotiated link bandwidth of the interface.

Based upon the statistics gathered for the individual interfaces, or based upon separately maintained aggregate counters, an aggregate bandwidth utilization for the packet processing device is determined. The aggregate bandwidth utilization may be based upon the aggregate used bandwidth as a fraction of the sum of configured bandwidth of all interfaces. According to another embodiment, it may be based upon the aggregate used bandwidth as a fraction of the sum of negotiated link bandwidth of all interfaces.

At step 504, it is determined whether criteria have been met to trigger an evaluation of the packet processing device for oversubscription. The trigger may be based upon the transition of a power-save enabled link to/from a low power state, a change in link utilization of one or more links served by the packet processing device, or a change in aggregate bandwidth utilization in the packet processing device, or similar event.

According to an embodiment, it is determined whether the aggregate bandwidth utilization of the packet processing device has either exceeded or fallen below a configured threshold. The configured threshold may include one or more thresholds that are preconfigured or that may be dynamically determined based upon factors, such as, but not limited to: the level of responsiveness to changes in bandwidth utilization that is desired from the packet processing device, and the environment in which the packet processing device is deployed. For example, configuring thresholds at smaller intervals may enable the packet processing device to respond faster to changes in bandwidth utilization. The desired level of responsiveness may be based upon the level of power savings that may be achieved by oversubscription. Environmental considerations, such as time of day, whether the packet processing device is located in a core network, a data center, or corporate network, may also be considered. For example, it may be known that the data traffic processed by the packet processing device varies rapidly at relatively small intervals during a particular time of day. In such a case, one may decide not to have the packet processing device oversubscribed even through thresholds have been crossed, because of the rapid variations in the traffic.

In another embodiment, the determination as to whether the aggregated bandwidth crossed (e.g., exceeded or fallen below) a threshold, may be based upon a combination of one or more thresholds configured at the individual interface level, and the thresholds at the aggregated level. For example, a relatively large change in bandwidth utilization at a particular interface may, either by itself or in combination with a smaller change in the aggregated bandwidth utilization, warrant the packet processor to consider that an aggregated bandwidth threshold was crossed, so that further processing according to method 500 may be performed.

At step 506, an aggregate minimum bandwidth is determined for the packet processing device. The aggregate minimum bandwidth may be determined based on the utilization of one or more power-save enabled links. The aggregate minimum bandwidth may be further determined based upon portions of latency sensitive traffic and non-latency sensitive traffic associated with the power-save enabled links so that the packet processing device can maintain its processing commitments and latency commitments to traffic flows. According to an embodiment, the aggregate minimum bandwidth is determined by separately considering the bandwidth utilization with respect to latency sensitive traffic and non-latency sensitive traffic associated with the power-save enabled links. The aggregate minimum bandwidth may be further adjusted based upon application requirements including, but not limited to, latency and other QoS requirements. Determination of aggregate minimum bandwidth is described below in relation to FIG. 6.

At step 508, one or more processors in the packet processing device are configured to support the aggregate minimum bandwidth determined above. The processor configuration includes selecting the number of active processors from the available processors and setting their corresponding clock rates so as to enable the packet processing device to have sufficient processing capacity to process the data traffic level associated with the determined aggregate minimum bandwidth. The determination of the processor configuration is described below in relation to FIG. 7.

At step 510, it is determined whether the current processor configuration in the packet processing device is already substantially in accordance with the determined desired processor configuration. The determination of whether the current configuration is substantially similar to the determined desired configuration may be based upon one or more configurable thresholds. For example, a threshold difference in clock rate may be defined such that if the difference in clock rate between the newly determined desired configuration and the current configuration for at least one of the clocks does not exceed the threshold, then the two configurations can be considered substantially in accordance with each other. If the two configurations are substantially in accordance with each other, then processing in method 500 proceeds back to 502 to continue monitoring statistics. Otherwise, if the two configurations are not substantially in accordance with each other, then method 500 proceeds to step 512.

At step 512, the packet processing device is reconfigured to change the processing capacity in accordance with the desired processor configuration determined at step 508. The reconfiguration may result in oversubscribing, removing an oversubscription, increasing the amount of oversubscription, or reducing the amount of oversubscription of the processing capacity of the packet processing device. The reconfiguration may result in one or more processors being activated or deactivated, and/or one or more clocks having their clock rate changed. Clock rates for processors may be changed by a known method such as, but not limited to, adjusting a reference rate for the corresponding clock or by changing a CPU multiplier. Other configuration changes that affect the aggregate processing capacity are possible and are contemplated as embodiments. For example, aggregate processing capacity may also be changed by actions such as, but not limited to, enabling or disabling one or more processing blocks in a processor, enabling or disabling one or more bus interconnects, and enabling or disabling one or more memory controllers, and the like.

The reconfiguration may be performed in a manner so that traffic is not disrupted. For example, reconfiguration may be performed as a gradual transition to the new configuration. A change in clock rate for one or more processors may be performed as two or more smaller changes to the clock rate, that together achieve the desired size change. If more than one processor is to be powered down, then, rather than powering down multiple processors at a time, processors may be powered down one by one until the desired number is powered down.

The reconfiguration of the packet processing device to oversubscribe its processing capacity in accordance with the determined aggregate minimum bandwidth is directed to matching the processing capacity of the packet processing device to the actual load and performance requirements of the traffic flows that are serviced by the packet processing device. The oversubscription of the processing capacity of the packet processing device is performed based upon an estimation of the expected actual input workload as represented by the aggregate minimum bandwidth.

Figure 6:
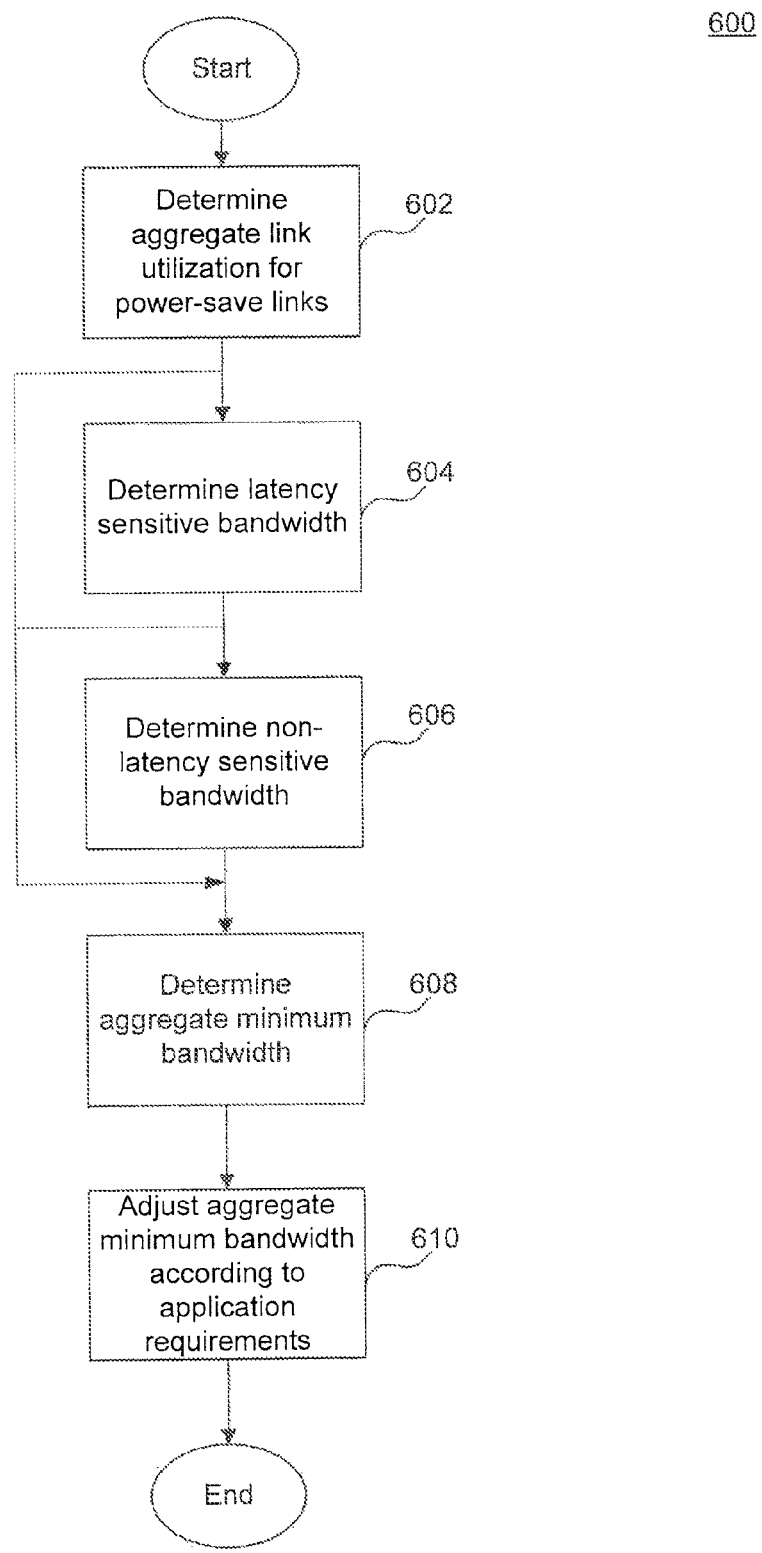
FIG. 6 illustrates a flowchart of a method for determining an aggregate minimum bandwidth, according to an embodiment of the present disclosure.

FIG. 6 illustrates a flowchart of a method 600 for determining an aggregate minimum bandwidth, according to an embodiment of the present disclosure. Method 600 can, for example, be used in performing step 506 of method 500. The steps 602-610 of method 600 may be performed in an order other than the order illustrated. Method 600 may not require all of the steps 602-610.

At step 602, an aggregate link utilization of the one or more power-save enabled links of the packet processing device is determined. The aggregate link utilization may be based upon the portion of time each power-save enabled link was in low-power mode over a predetermined time interval. Statistics, such as, for example, per-port power save statistics 310 may include the duration for which each link was in power-save mode. Considering an example, if the power-save links were in low power mode (in aggregate) for 50% of the time during the measured interval, then an aggregate link utilization for the power-save enabled links is determined to be 50%. Other techniques of determining an aggregate link utilization of the power-save enabled links are possible and are contemplated as embodiments. For example, a low power mode may be counted for the aggregate link utilization only if it is longer than a threshold time interval, one or more links may be altogether excluded from the aggregate link utilization based upon one or more characteristics of the link, and the link utilizations of nodes may be attributed different weights based upon some link characteristics in determining the aggregate.

At step 604, the portion of the latency sensitive bandwidth associated with the power-save enabled links is determined. As noted above, latency sensitive traffic flows may be identified based upon a header field, such as, but not limited to, protocol type, VLANID, or other identifying header field. Latency sensitive traffic may also be identified based upon configuration. For example, one or more interfaces may have reserved capacity for configured flows and the configuration associated with some or all of those flows may indicate a quality of service or other parameter indicative of latency requirements of the flows. Voice and video traffic flows are examples of latency sensitive traffic.

According to an embodiment, in computing the bandwidth for latency sensitive traffic, a maximum bandwidth for each latency sensitive traffic flow is determined. Determined maximum bandwidths for latency sensitive traffic flows may be used in order to ensure the dynamic reconfiguration does not reduce processing capacity of the packet processing device to such an extent that the latency sensitive traffic cannot meet its latency requirements. The per flow maximum bandwidth may be based upon per-flow configurations where such configuration is available, or based upon the corresponding interface configuration. With respect to the latter, for a latency sensitive packet flow arriving on an interface I, the bandwidth of the interface I (more accurately, of the link corresponding to interface I) is considered the maximum bandwidth. According to another embodiment, the operating bandwidth of the interface I may be considered as the maximum bandwidth applicable to the latency sensitive flow. According to yet another embodiment, a peak bandwidth (e.g., as collected in 306) associated with each latency sensitive traffic flow is considered its maximum bandwidth. However, if more than one latency sensitive traffic flow is on an interface I, the sum of their maximum bandwidths cannot exceed the configured (or, in some instances, the negotiated) bandwidth of the interface.

At step 606, the portion of the bandwidth that is not latency sensitive is determined. According to an embodiment, all traffic flows that are not identified as latency sensitive are considered non-latency sensitive. According to an embodiment, the bandwidth of the non-latency sensitive traffic flows may be determined as the sum of all the determined bandwidth for the interfaces or for the separate non-latency sensitive flows.

At step 608, the aggregate minimum bandwidth is determined. The aggregate minimum bandwidth, as described above, is the bandwidth corresponding to a processing capacity at which the packet processing device can be oversubscribed while enabling the latency sensitive traffic to still meet the latency requirements despite the oversubscription.

According to an embodiment, the aggregate minimum bandwidth is determined based upon the current processing capacity and the aggregate link utilization of the power-save enabled links. The aggregate minimum bandwidth, for example, may be determined by reducing the current processing capacity proportionally to the available (e.g., unused) link utilization of the power-save enabled links. For example, if the aggregated link utilization of the power-save enabled links is 60%, then the current processing capacity may be reduced by 40%. Thus, according to this embodiment, a packet processing device with a current processing capacity of 10 Gbps can, upon having a power-save link utilization of 60%, dial down its capacity to 60% of the 10 Gbps. Such a reduction, or oversubscription, of processing capacity would effectively take advantage of the intervals during which the links are in low power mode to catch up on the processing of enqueued data, while reducing the running speed of the processors to save power.

Where the packet processing device includes power-save enabled links as well as links that are not power-save enabled, the aggregate minimum bandwidth may be configured to accommodate the entirety of the portion of the current aggregate bandwidth attributable to the non-power-save enabled links and reduce only portion of the current processing capacity attributable to the power-save links in proportion to the available (e.g., unused) link utilization of the power-save enabled links. For example, according to an embodiment, it may be assumed that the non-power-save enabled links operate at the full link rate without any link rate changes due to power saving considerations.

According to another embodiment, the aggregate minimum bandwidth is determined based upon the aggregate link utilization of the power-save enabled links and the latency sensitive traffic associated with those links. The aggregate minimum bandwidth is determined so that even while reducing processing capacity based upon the link utilization, sufficient processing capacity is maintained for latency sensitive traffic to be processed according to their latency requirements. Continuing the example described above, the link utilization alone suggests a reduction of processing capacity by 40%. However, if the latency sensitive traffic is 30% of the traffic associated with the power-save enabled links, then the reduction may be adjusted to 28% (e.g., considering reduction for only the 70% of non-latency sensitive traffic within the 40%) of the current processing capacity. By considering the latency sensitive traffic in determining the size of the oversubscription, the processing capacity reduction can be implemented without causing the latency sensitive traffic to violate its latency requirements.

According to yet another embodiment, the aggregate minimum bandwidth is determined based upon the aggregate link utilization of the power-save enabled links, the latency sensitive traffic associated with those links, as well as a portion of the non-latency sensitive traffic associated on those links. According to this embodiment, the processing capacity of the packet processing device is adjusted so that some minimum bandwidth is accommodated for the non-latency sensitive traffic associated with the power-save enabled links in the aggregate minimum bandwidth calculation. Referring back to the previous example, the aggregated link utilization of the power-save enabled links is 60%, and the initial estimate of the possible reduction in current processing capacity is 40%. According to this embodiment, the initially estimated reduction in current processing capacity can be further adjusted based upon a combination of latency sensitive and non-latency traffic associated with the power save enabled links. A configurable portion of the non-latency sensitive traffic and a configurable portion of the latency sensitive traffic, a bandwidth capacity to be protected may be determined.

In some embodiments, in an optional step 610, the determined aggregated minimum bandwidth is adjusted in accordance with application requirements. Application requirements may include latency and other QoS requirements and/or energy saving preferences. The aggregated minimum bandwidth, initially determined based upon bandwidth utilization, may be changed by increasing it or decreasing it in response to application requirements. For example, application requirements of latency less than a configured threshold may lead to the aggregated minimum bandwidth increased by a configured amount, in order to provide a greater margin of processing capacity to achieve the desired latency requirements.

Figure 7:
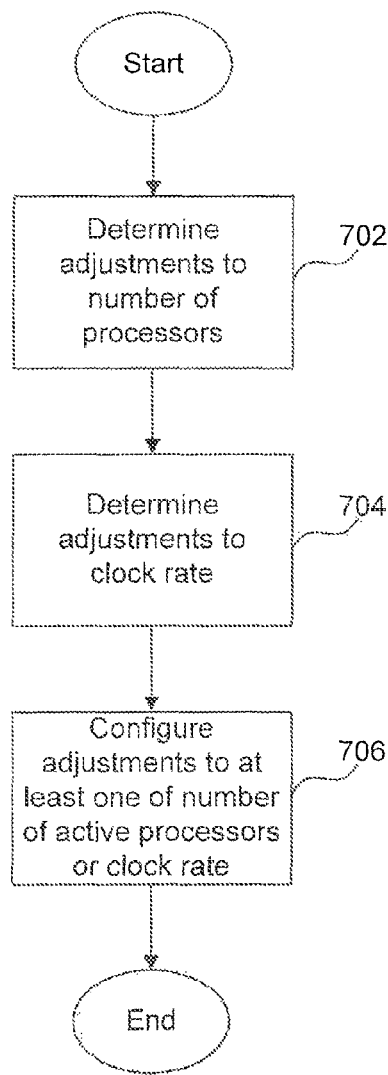
FIG. 7 illustrates a flowchart of a method for configuring processors in a packet processing device, in accordance with an embodiment of the present disclosure.

FIG. 7 illustrates a flowchart of a method for configuring processors in a packet processing device, in accordance with an embodiment. Method 700 can, for example, be used in performing steps 508 and 512 of method 500. The steps 702-706 of method 700 may be performed in an order other than the order illustrated. Method 700 may not require all of the steps 702-706. Method 700 is used to dynamically reconfigure one or more processors and/or associated clocks, so that the processing capacity of the packet processing device more closely matches the actual traffic load that must be processed in the packet processing device.

At step 702, an adjustment to the number of active processors is determined based upon a determined aggregate minimum bandwidth. The adjustment may be determined based upon a benchmark which indicates how much processing capacity (in terms of bandwidth) is made available by one processor. According to an embodiment, one or more such benchmarks may be configured for each type of processor operating in the packet processing device.

At step 704, an adjustment to one or more clock rates are determined based upon a determined aggregate minimum bandwidth. The adjustment may be determined based upon a benchmark which indicates how much processing capacity (in terms of bandwidth) is made available by one processor operating at a particular clock rate and/or how much processing capacity may be changed by increasing or decreasing a clock rate by a predetermined amount. According to an embodiment, one or more such benchmarks may be configured for each type of processor operating in the packet processing device.

At step 706, adjustments are made to either the number of active processors or one or more clock rates, or both. According to an embodiment, based upon the determinations at 702 and 704, a configuration of active processors and corresponding clock speeds is determined in order to service the determined aggregated bandwidth utilization. The configuration changes may be automatically made to the processors and/or the clocks associated with the processors.

The representative functions of the communications device described herein can be implemented in hardware, software, or some combination thereof. For instance, processes 500, 600 and 700 can be implemented using computer processors, computer logic, ASIC, FPGA, DSP, etc., as will be understood by those skilled in the arts based on the discussion given herein. Accordingly, any processor that performs the processing functions described herein is within the scope and spirit of the present invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for controlling power consumption of a packet processing device, the method comprising:
   determining a link utilization for one or more links coupled to the packet processing device;
   determining an aggregate desired processing bandwidth for the packet processing device based upon the determined link utilization; and
   adjusting a processing capacity of the packet processing device based upon the determined aggregate desired processing bandwidth by reconfiguring one or more processors of the packet processing device.

2. The method of claim 1, wherein the determining the link utilization comprises:
   determining the link utilization based upon a portion of a time interval in which the one or more links were in a low-power state.

3. The method of claim 1, wherein the determining the aggregate desired processing bandwidth comprises:
   determining an initial processing bandwidth based upon the determined link utilization; and
   updating the initial processing bandwidth based upon traffic associated with the one or more links to determine the aggregate desired processing bandwidth.

4. The method of claim 3, wherein the updating the initial processing bandwidth comprises:
   determining a first aggregate bandwidth for latency sensitive traffic associated with the one or more links; and
   increasing the initial processing bandwidth to include at least a portion of the first aggregate bandwidth.

5. The method of claim 3, wherein the updating the initial processing bandwidth comprises:
   determining a first aggregate bandwidth for latency sensitive traffic associated with the one or more links;
   determining a second aggregate bandwidth for non-latency sensitive traffic associated with the one or more links; and
   increasing the initial processing bandwidth to include a sum of at least a portion of the second aggregate bandwidth and at least a portion of the first aggregate bandwidth, wherein the included portion of the second aggregate bandwidth is different from the included portion of the first aggregate bandwidth.

6. The method of claim 5, wherein the included portion of the first aggregate bandwidth is greater than the included portion of the second aggregate bandwidth.

7. The method of claim 5, wherein the included portion of the first aggregate bandwidth is based upon a bandwidth of the latency sensitive traffic incoming to the packet processing device.

8. The method of claim 7, wherein the bandwidth of the latency sensitive traffic is determined based upon historical analysis of the latency sensitive traffic.

9. The method of claim 5, wherein the determining the first aggregate bandwidth for latency sensitive traffic comprises:
   determining the first aggregate bandwidth based upon a peak bandwidth of the latency sensitive traffic incoming to the packet processing device.

10. The method of claim 3, further comprising:
changing the determined aggregate desired processing bandwidth based upon one or more application requirements.

11. The method of claim 1, wherein the adjusting the processing capacity of the packet processing device comprises:
determining a difference in the determined aggregate desired processing bandwidth in relation to a previous point in time; and
determining a desired difference of a clock rate of the one or more processors in proportion to the determined difference in the determined aggregate desired processing bandwidth; and
changing the clock rate of the one or more processors in accordance with the desired difference.

12. The method of claim 1, wherein the adjusting the processing capacity of the packet processing device further comprises:
changing a quantity of active processors of the packet processing device.

13. The method of claim 12, wherein the adjusting the processing capacity of the packet processing device further comprises:
determining a difference in the determined aggregate desired processing bandwidth in relation to a previous point in time; and
determining a desired difference of the quantity of active processors in proportion to the determined difference in the determined aggregate desired processing bandwidth,
wherein the changing the quantity of active processors is performed in accordance with the desired difference.

14. The method of claim 1, further comprising:
identifying at least one link of the one or more links of the packet processing device as not being power-save enabled, wherein the determined aggregate desired processing bandwidth is based further upon the identified at least one link operating at a link rate unaffected by power-saving changes.

15. A packet processing device, comprising:
an aggregate desired bandwidth estimator configured to:
determine a link utilization for one or more links coupled to the packet processing device; and
determine an aggregate desired processing bandwidth for the packet processing device based upon the determined link utilization; and
a processing capacity adjuster configured to adjust a processing capacity of the packet processing device based upon the determined aggregate desired processing bandwidth by reconfiguring one or more processors of the packet processing device.

16. The packet processing device of claim 15, wherein the aggregate desired bandwidth estimator is further configured to:
determine an initial processing bandwidth based upon the determined link utilization; and
update the initial processing bandwidth based upon traffic associated with the one or more links to determine the aggregate desired processing bandwidth.

17. The packet processing device of claim 16, wherein the aggregate desired bandwidth estimator is further configured to:
determine the link utilization based upon a portion of a time interval in which one or more of the links were in a low-power state.

18. The packet processing device of claim 15, wherein the processing capacity adjuster is further configured to:
determine a difference in the determined aggregate desired processing bandwidth in relation to a previous point in time; and
determine a desired difference of a clock rate of the one or more processors in proportion to the determined difference in the determined aggregate desired processing bandwidth; and
change the clock rate of the one or more processors in accordance with the desired difference.

19. A computer readable storage medium having instructions stored thereon, that when executed by a processor, causes the processor to:
determine a link utilization for one or more links coupled to a packet processing device;
determine an aggregate desired processing bandwidth for the packet processing device based at least upon the determined link utilization; and
adjust a processing capacity of the packet processing device based upon the determined aggregate desired processing bandwidth by reconfiguring the processor.

* * * * *